June 17, 1930.  C. C. JONES  1,764,842
AIRFOIL
Filed Feb. 15, 1929  2 Sheets-Sheet 2
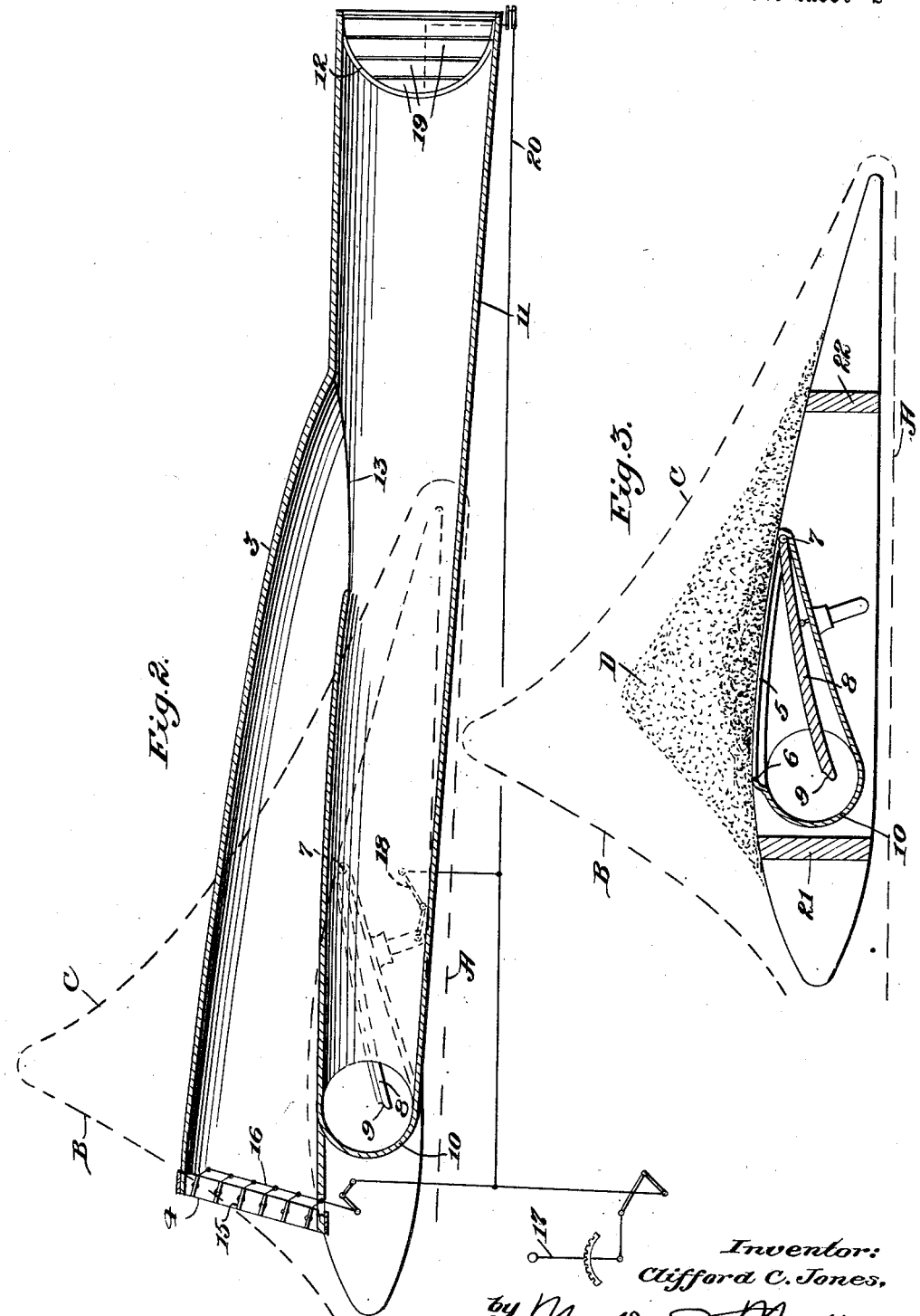
Inventor:
Clifford C. Jones,
by Mason & Mason
Att'ys.

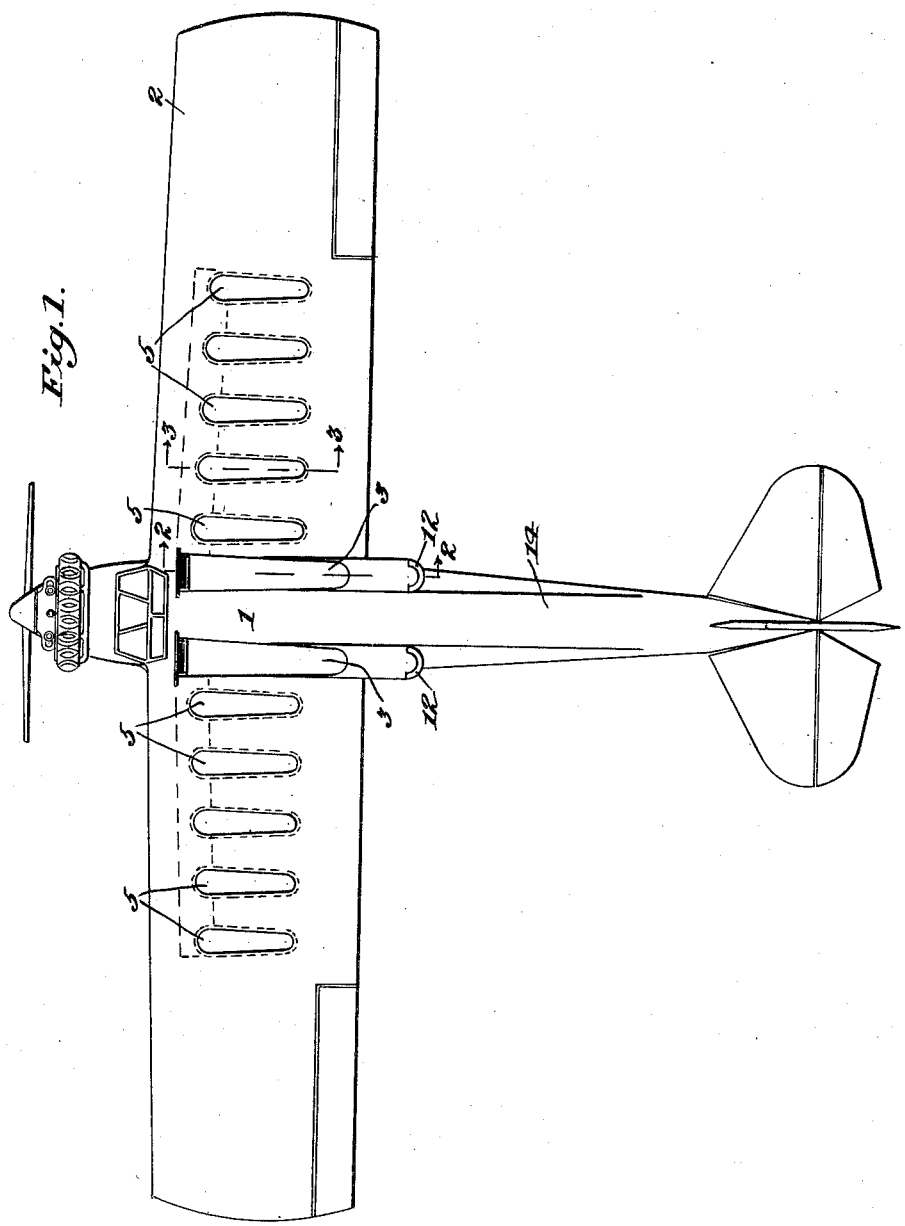

Patented June 17, 1930

1,764,842

UNITED STATES PATENT OFFICE

CLIFFORD CLARKE JONES, OF DETROIT, MICHIGAN

AIRFOIL

Application filed February 15, 1929. Serial No. 340,192.

One object of the invention is to provide an airplane having an improved airfoil which increases materially the lift efficiency of the airfoil by removing the boundary layer of air which has accumulated on the upper surface of the airfoil during flight.

Another object of the invention is to improve the general aerodynamical lift values obtained in flight and to likewise increase the aerodynamical lift values obtained at various speeds both high and low for slower landings and for quicker take-offs.

Other objects will appear hereinafter throughout the specification.

In the drawings:

Fig. 1 is a plan view of an airplane showing an embodiment of my invention.

Fig. 2 is a vertical longitudinal sectional view of the airfoil of an airplane equipped with my invention taken on the line 2—2 of Fig. 1.

Fig. 3 is a vertical section through the airfoil on the line 3—3 of Fig. 1.

It has been found that an airplane in flight builds up a boundary layer of air on the upper camber of the airfoil. I have found that I have been able to increase the lift force of the airfoil of an airplane by removing this boundary layer which consists of a thickness of pocketed air, which increases in density at higher speeds. The boundary layer of air before mentioned forms an insulating layer through which the kinetic forces of the air during flight must penetrate in order to produce lift on the airfoil. I have found that this boundary layer may be removed by locating at a plurality of points, preferably between the front and rear spars of an airfoil, a series of openings or vents into which the boundary layer of air is drawn by means of suction from a conduit. Each of these openings or vents is provided with a valve which can be opened to greater or less degree in order to scavenge the boundary layer or dead air which forms on the upper camber. The valves in the openings are constructed and arranged to be controlled by mechanism which accomplishes its work of scavenging the wild air or boundary layer to the extent that the greater the speed of the airplane, the greater the amount of air forming the boundary layer that is removed. In other words, it has been found that the boundary layer or air pocket tends to become thicker as the speed of the plane increases. These openings tend to create a vacuum on the surface of the upper camber and when partially or fully opened (according to the speed of the plane) will cause the partial vacuum to be increased. The valves before mentioned may be opened to any one of, say, six positions between zero and 11°, but the valves should be so constructed that they can be opened to an amount greater or less than 11° according to the size and type of airfoil used. The openings are so located with their valves as to be in the center of pressure of the airfoil. The valves may be controlled either manually or automatically. In the drawings I have shown diagrammatically a manual control means, but if it is desired to control them automatically they may be controlled by the pressure set up in the header, which increases as the speed of the ship increases.

1 indicates an airplane having an airfoil 2. The numeral 3 indicates one or more headers which are mounted on the airfoil 2. The inlet 4 to the header 3 is located near the advancing edge of the airfoil 2. 5 indicates a plurality of openings or vents in the upper camber of the airfoil 2. As illustrated in Fig. 3 I have placed these openings between the forward and rear spars which extend longitudinally of the airfoil, the openings being so located that they are in the center of pressure of the airfoil.

Each opening 5 has a lip or flange member 6. Pivoted at 7 is a valve 8 which has a lip 9 adapted when closed to fit snugly within the opening 5. Extending longitudinally of the air foil are one or more conduits 10 which connect all of the openings 5 with one or more venturi or passageways 11. At the rear of the venturi or passageways 11 are exhaust openings 12. The headers 3 are connected to the passageways 11 at 13. It is preferred to equip each ship with two headers mounted above the passageways 11, the passageways 11 extending on either side of the turtleback 14.

I have diagrammatically shown in Fig. 2 unitary control means for regulating the entrance of air into the headers 3 through opening 4, the opening of the valve 8 and exit through exhaust 12. Located in the opening 4 are a plurality of pivoted shutters 15 which are connected so as to be operated by a rod 16, which is adapted to be actuated through suitable connections by lever 17. Also connected to lever 17 to be actuated thereby is a bell crank 18 which opens or closes valves 8. Located in exhaust 12 are a plurality of shutters 19 which are arranged to open and close the opening 12 by actuation of the lever 17 through connection 20. Preferably the valves 8 are opened 5° in advance of the opening of the inlet for the header opening 4 and the exhaust 12.

In dotted lines I have indicated at A the course of air currents below the lower camber of airfoil 2. It will be seen that these currents are substantially parallel thereto. The course of air currents immediately above the upper camber of the airfoil is indicated at B while those above the rear portions of the upper camber are indicated at C. These air currents B and C tend to produce a partial vacuum above the upper camber and thereby exert a lifting force on the airfoil. However, there is a layer of air immediately above the airfoil which is indicated at D. This air pocket or boundary layer of air tends to reduce the partial vacuum and to decrease and in consequence reduce the lifting force exerted on the top or upper camber of the airfoil.

When the valves 8 have been moved to partially open the vents 5 by means of the lever 17, which also partially opens the inlets 4 of the headers 3 and the exhaust 12, air will enter the opening 4 and passing through headers 3 will produce a venturi effect that will create a suction in the forward end of venturi 11 to draw air in vents 5. The air will pass from vents 5 through conduits 10 which join venturi 11. The greater the speed of the plane the larger the amount of air which will pass through a header 3 and consequently the greater the amount of suction which will be exerted through vents 5 to exhaust the boundary layer of air D.

The numeral 21 indicates the forward spar and the numeral 22 indicates the rear spar of the airfoil.

The operation is as follows:

In flight, the boundary layer or air pocket is exhausted and the air is pulled through the vents 5 which are placed at various points along the span of the airfoil or wing of the ship.

The two factors which control the amount of air exhausted through the air vents 5 are:
1. The amount of opening of the valves 8 and the opening of the inlet to the headers 3 and exhaust 12, and
2. The speed of the ship.

My invention has been found to be particularly useful when taking off for the reason that because of the fact that the boundary layer of air can be readily removed by means of the air vents, even at comparatively low speeds, a higher partial vacuum can be obtained on the upper camber of the airfoil, thereby increasing the lift factor and enabling the ship to take off without it being necessary to taxi to the extent that it has heretofore been necessary. It is not only possible to provide a quicker take-off, but it is also possible to provide a slower landing, which is highly desirable.

By means of my invention a landing can be made within a smaller area, such as on the deck of a marine vessel, my invention allowing the plane to hover to a greater extent than could be provided by any plane heretofore used.

I may use any number of vents 5 and the arrangement and size of the conduits, headers and venturi may be varied to suit requirements and conditions of use.

All of the valves 8 are preferably connected to control lever 17 so as to be opened and closed simultaneously to the same degree. However, I do not wish to be limited in the operation of the valves to this mode of operation.

It will be apparent that one or more valves on either side of the directional center of the airplane could be connected to lever 17 to open in advance of other of the valves located on either or both sides of the directional center of the airplane. For purposes of better control one or more valves could be opened on one side of the directional center of the airplane while those on the opposite side of said directional center would be allowed to remain closed, by connecting a separate lever 17 to its valves located on either side of the said directional center of the plane.

I have also found that by controlling the valves on the right airfoil proper, irrespective of those on the left airfoil proper, and vice versa, I am able to obtain the same aileron control now produced in standard design airfoils for lateral stability purposes. This mode of control may be used in place of the ailerons or to supplement the ailerons now used in standard design airfoils.

It is to be understood that I desire not to be limited in the practice of my invention to the construction and arrangement of parts illustrated in the accompanying drawings, but desire to comprehend within the scope of my invention all embodiments as defined by the accompanying claims.

I claim:
1. In an airplane, in combination an airfoil, a fuselage having a turtleback, a plural- ity of vents communicating with the upper surfaces and arranged at a plurality of points along the span of said airfoil, a header located on said turtleback having an inlet and a communicating passageway connecting with said vents and an exhaust at one end of said passageway.

2. In an airplane, in combination an airfoil, means for increasing the lift character of the airfoil consisting of a plurality of valves located in the center of pressure of said airfoil, means for creating a partial vacuum above said airfoil consisting of a header having an air inlet and means for simultaneously regulating the amount of air admitted to said air inlet and the opening of said valves.

3. In an airplane, in combination an airfoil, a fuselage, a plurality of vents communicating with the upper surfaces and arranged at a plurality of points along the span of said airfoil, a header supported by said fuselage and having an air inlet and communicating means connected with said vents, a passageway communicating with said header and said means, and an exhaust at one end of said passageway, said fuselage having means for supporting said passageway and exhaust.

4. In an airplane, in combination an airfoil, a fuselage, a plurality of vents communicating with the upper surfaces and arranged at a plurality of points along the span of said airfoil, a header having an air inlet, communicating means connected with said vents, a passageway communicating with said header and said means and an exhaust, said fuselage having means for directly supporting said exhaust.

5. In an airplane, in combination an airfoil, a fuselage, a plurality of vents communicating with the upper surfaces and arranged at a plurality of points along the span of said airfoil, a header having an air inlet and communicating means connected with said vents, a passageway communicating with said header and said means, said fuselage having means for supporting said passageway and exhaust and means for controlling the opening of said header and at least one of said vents.

In testimony whereof I have hereunto set my hand this 14th day of Feb., A. D. 1929.

CLIFFORD C. JONES.